US007062241B2

(12) United States Patent
Krüger et al.

(10) Patent No.: US 7,062,241 B2
(45) Date of Patent: Jun. 13, 2006

(54) SIGNAL PROCESSOR AND METHOD FOR THE SYSTEM-INDEPENDENT DIGITAL EVALUATION OF MOBILE COMMUNICATIONS RECEPTION SIGNALS OF VARIOUS MOBILE PHONE STANDARDS

(75) Inventors: Martin Krüger, München (DE); Dietmar Wenzel, München (DE)

(73) Assignee: Infineon Technologies AG, Munich (DE)

( * ) Notice: Subject to any disclaimer, the term of this patent is extended or adjusted under 35 U.S.C. 154(b) by 414 days.

(21) Appl. No.: 10/389,611

(22) Filed: Mar. 14, 2003

(65) Prior Publication Data

US 2003/0179834 A1    Sep. 25, 2003

Related U.S. Application Data

(63) Continuation of application No. PCT/DE01/03391, filed on Aug. 30, 2001.

(30) Foreign Application Priority Data

Sep. 14, 2000    (DE)    ................................ 100 45 546

(51) Int. Cl.
*H04B 1/06*    (2006.01)
*H04M 7/00*    (2006.01)
*H04M 1/00*    (2006.01)

(52) U.S. Cl. ...................... 455/230; 455/130; 455/255; 455/550.1; 455/552.1; 455/553.1

(58) Field of Classification Search ................ 455/230, 455/255, 256, 552.1, 553.1, 84, 130, 550.1
See application file for complete search history.

(56) References Cited

U.S. PATENT DOCUMENTS

| | | | | | |
|---|---|---|---|---|---|
| 5,521,938 | A | * | 5/1996 | Stewart et al. | ............... 375/146 |
| 5,557,642 | A | * | 9/1996 | Williams | ..................... 375/316 |
| 5,666,322 | A | * | 9/1997 | Conkle | ........................ 365/233 |
| 6,871,207 | B1 | * | 3/2005 | Nanda et al. | ............... 708/313 |
| 2004/0093481 | A1 | * | 5/2004 | Ganapathy et al. | ......... 712/213 |
| 2004/0190645 | A1 | * | 9/2004 | Critchlow et al. | .......... 375/316 |

FOREIGN PATENT DOCUMENTS

| | | |
|---|---|---|
| EP | 0 858 628 B1 | 8/1998 |
| WO | 94/05087 | 3/1994 |
| WO | 99/09721 | 2/1999 |

OTHER PUBLICATIONS

Gunn, J. E. et al.: "A Low-Power DSP Core-Based Software Radio Architecture", IEEE Journal of Selected Areas in Communications, vol. 17, No. 4 Apr. 1999, pp. 574-590.
Wenzel, D.: "Ein digitaler Fernseh- und Tonmodulator für digitale Breitbandverteilnetze" [A Digital Television and Tone Modulator for Digital Broadband Distribution Networks], Fortschritt-Berichte VDI-Verlag, No. 617, 1999, pp. 20-26.

* cited by examiner

*Primary Examiner*—Curtis Kuntz
*Assistant Examiner*—Michael T. Thier
(74) *Attorney, Agent, or Firm*—Laurence A. Greenberg; Werner H. Stemer; Ralph E. Locher

(57) ABSTRACT

Only a single, standard-independent clock rate is generated in a signal processor or a signal processing structure, and correspondingly only precisely one clock frequency generator is then arranged on the chip. The signal processing path includes at least one controllable, asynchronous decimator for transposing the reception signals present in a uniform time frame into a respective standard-specific time frame. This enables signals of a variety of mobile phone standards to be processed.

10 Claims, 4 Drawing Sheets

SIGNAL PROCESSOR AND METHOD FOR THE SYSTEM-INDEPENDENT DIGITAL EVALUATION OF MOBILE COMMUNICATIONS RECEPTION SIGNALS OF VARIOUS MOBILE PHONE STANDARDS

CROSS-REFERENCE TO RELATED APPLICATIONS

This application is a continuation of copending International Application No. PCT/DE01/03391, filed Aug. 30, 2001, which designated the United States and which was not published in English.

BACKGROUND OF THE INVENTION

1. Field of the Invention

The invention relates generally to signal processors for mobile communication and to corresponding digital methods for evaluating mobile communications reception signals. In particular, the invention relates here to signal processors and methods in which mobile communications reception signals of different mobile phone standards are received and evaluated with corresponding digital circuits which are integrated on a single chip.

In the GSM standard which is currently used in mobile communication, so-called GMSK (Gaussian Minimum Shift Keying) modulation is used. The modulation employs a signal space with signal points which have a phase difference of 180°. For this purpose, the GPRS packet service (General Packet Radio Service) has been developed, which service renders it possible to operate at relatively high data rates. The further currently used standard which is known is the TIA/EIA-136-(IS-136-) standard in which a $\pi/4$ DQPSK (D quaternary PSK) modulation method is used to generate the transmission signals. The EDGE standard and the associated EGPRS (Enhanced GPRS) packet service were defined to a certain extent as a transitional standard between GSM and GPRS on the one hand and UMTS on the other. EDGE is still a TDMA (Time Division Multiple Access) method but a change over from GMSK modulation to 8-PSK modulation is already taking place. In 8-PSK modulation, a signal space with 8 signal points is used, the phase difference between the individual signal points being 45°.

A general objective in mobile communications is to develop mobile communications devices which are configured for operation with a plurality of different mobile phone standards and can therefore be used in the various mobile phone systems. This requirement is fulfilled in the baseband processors PCI 3700 and PCI 3800 from PrairieComm for GSM and TIA/EIA-136 and for GSM, EDGE and TIA/EIA-136 by using a separate specific signal processing architecture for each mobile phone standard both for the generation and the evaluation of the digital signals, and by supplying the signal processing architecture with a signal clock rate which is precisely matched to the respective mobile phone standard.

As mentioned above, the problem here is the fact that at the reception end the evaluation methods also require different signal clock rates. This problem has been solved hitherto—as for example in the baseband processors PCI 3700 and PCI 3800 from PrairieComm for GSM and TIA/EIA-136 and for GSM, EDGE and TIA/EIA-136 mentioned above—as at the transmitter end in that a plurality of different clock frequency generators and correspondingly different signal processing architectures have been used for the individual mobile phone standards. However, the result of this is that a plurality of circuit blocks are necessary for similar functions and have to be supplied with different signal clock rates. As a rule, this means there is an increased demand for components and for chip area. Operating with different system clock rates thus makes it more difficult to integrate the functions in one component. Owing to the separate processing with different clock rates it is generally also impossible to use a uniform interface to transfer the reception signals, which are supplied by the assemblies for transposition from the carrier-frequency position into the equivalent low pass position, so that there is usually also a need for a plurality of different A/D converters to which the reception signals have to be transferred via a plurality of interfaces.

SUMMARY OF THE INVENTION

The present invention is thus based on the assumption that mobile communication signals of various mobile phone standards are transmitted. It is accordingly an object of the invention to provide a device and a method for digitally evaluating reception signals in mobile communications that are compatible with several mobile phone standards and which overcomes the above-mentioned disadvantages of the heretofore-known devices and methods of this general type. The object is also to provide a signal processor and a method for the digital evaluation of such mobile communication reception signals with which different mobile phone standards can be supported on a single chip with a reduced demand for components and for chip area.

With the foregoing and other objects in view there is provided, in accordance with the invention, a signal processor for digitally evaluating mobile communications reception signals compatible with a plurality of different mobile phone standards. The processor comprises:

a single clock frequency generator for processing the reception signals of various mobile phone standards; and at least one controllable decimator for transposing the reception signals sampled in a uniform time frame into standard-specific time frames;

the decimator having a phase accumulator, a coefficient memory, a buffer memory, a multiplier, and an adder unit;

the coefficient memory having an input, the multiplier having a first input, a second input, and an output;

the phase accumulator having an output connected to the input of the coefficient memory, and the phase accumulator controlling a selection of coefficients with a predefinable control variable;

the buffer memory having an input receiving input data and an output connected to the first input of the multiplier, the coefficient memory having an output connected to the second input of the multiplier, and the adder unit having an input connected to the output of the multiplier and the adder unit adding terms and outputting an addition result.

With the above and other objects in view there is also provided, in accordance with the invention, a method for digitally evaluating mobile communications reception signals that are compatible with a plurality of different mobile phone standards. The method comprises the following method steps:

generating a standard-independent clock frequency for signal processing the reception signals;

transposing the reception signals sampled in a uniform time frame into standard-specific time frames with at least one controllable decimator;

providing a decimator with a coefficient memory, a buffer memory, a multiplier, and an adder unit, and controlling the decimator with a phase accumulator, wherein an output of the phase accumulator is connected to an input of the coefficient memory, and controlling a selection of coefficients with the phase accumulator by way of a predefinable control variable;

feeding input data to the buffer memory, outputting from the buffer memory to a first input of the multiplier, outputting from the coefficient memory to a second input of the multiplier, outputting from the multiplier to an input of the adder unit, and adding terms in the adder unit and outputting a result to an output.

The invention is advantageously employed with the mobile phone standards GSM, EDGE, TIA/EIA-136, mixed forms and partial combinations thereof. In accordance with a preferred embodiment, the system jointly employs various circuit components in different signal processing paths for a plurality of mobile phone standards. These jointly used components may include components for channel selection, frequency conversion, sampling rate conversion, A/D conversion, noise shaping, and phase and frequency correction.

A primarily important concept of the present invention is that only a single, system-independent clock rate needs to be generated for the signal processing of the reception signals of various mobile phone standards on the chip, and accordingly only precisely one clock frequency generator then has to be arranged on the chip.

If the time frames or modulation speeds provided in the mobile phone standards supported by the signal processor are different, which is usually the case, signals which are sampled in the uniform time frame must then be transposed or converted into the respective standard-specific time frame. This transmission is carried out by means of at least one controllable decimator in a jointly used signal processing path in which the transposition ratio can be predefined in a variable way. The control variable for the decimation ratio can be predefined here by a phase accumulator which controls the decimator.

A decimator which is actuated by a phase accumulator has in principle already been described in the Dissertation with the title "Ein digitaler Fernseh- und Tonmodulator für digitale Breitbandverteilnetze [A Digital Television And Sound Modulator For Digital Broadband Distribution Networks]" by Dietmar Wenzel which was produced at the Institut für Nachrichtenübertragung der Universität Stuttgart [Institute of Telecommunications Transmission at the University of Stuttgart] and which appeared in series 10 Informatik/Kommunikation der Fortschritt-Berichte [computer science/communications of progress reports] with the number 617 (ISBN 3-18-361710-2) from the VDI publishing house, Düsseldorf, 1999, the paper being referred to below as "Wenzel". The entire paper, in particular sections 3.3 to 3.7 (polyphase interpolator, M-tel-bandfilter, design of M-tel-low pass filters, filter structure for M-tel band filters with symmetrical pulse response) and sections 6.1 to 6.5 (asynchronous sampling rate conversion), as well as the appendix 8 are herewith incorporated by reference and they form a part of the disclosure herein. What is referred to as the asynchronous sampling rate converter which was developed during this work was based on the problem that when television channels are arranged in the frequency-division multiplex system the necessary bandwidth increases as the number of channels increases, and the necessary sampling frequency thus also increases. Before the addition of the individual frequency-shifted signals and signals to be transmitted, the sampling rate must therefore be increased and matched. For this purpose, controllable interpolators have been developed in which upward sampling of the sampling frequency is carried out through actuation with the phase accumulator.

In the present application, controllable decimators are used which can be considered as special embodiments of the interpolators described in the abovementioned dissertation in which, by actuation with the phase accumulator, downward sampling is carried out from the uniform time frame, which has a relatively high sampling frequency, to the time frame of the respective mobile phone standard which has a relatively low sampling frequency. For this reason, the decimators according to the invention are also referred to below as interpolators.

The decimator used according to the invention has a controllable decimation ratio and its architecture is preferably of simple design (for example linear decimator), it being nevertheless possible to use a large number of functional blocks jointly for the different signals.

At least one of the interpolators arranged in the common signal processing path can be formed, for example, by what is referred to as an FIR (Finite impulse response) interpolation filter. These filters may be embodied as what are referred to as M-tel band filters which carry out interpolation of the factor M=L, L being the number of branches in the filter structure of the polyphase interpolator.

The invention thus avoids the necessity to arrange a number of clock frequency generators and signal processing branches which corresponds to the number of supported mobile phone standards as a non-branched signal processing path which is used jointly by the mobile phone standards can be supplied with a uniform system clock. Furthermore, the assemblies can also be used jointly for channel selection, frequency conversion, A/D conversion, sampling rate conversion, frequency offset correction etc. for all the signal processing paths.

The decimator according to the invention transfers the reception signals from a uniform time frame into respective standard-specific "virtual" time frames. These "virtual sampling frequencies" which refer to sampling frequencies with which a D/A converter would have to convert the sampling values into equivalent analog signals are not always divisors of the common system clock frequency and nevertheless all the circuit blocks can advantageously be operated by the same system clock frequency.

The signal processing structure according to the invention enables integration of the blocks into an integrated circuit, in particular with respect to the synthesis, testability, layer etc., to be considerably simplified.

As the reception signals are firstly processed in a uniform time frame, only one A/D converter for the reception signals is respectively required for the I and Q components, and the reception signals can be transferred via the same interface to the assemblies for converting the carrier-frequency position into the low pass signals.

Other features which are considered as characteristic for the invention are set forth in the appended claims.

Although the invention is illustrated and described herein as embodied in a method for the system-independent digital evaluation of mobile communications reception signals of various mobile phone standards, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
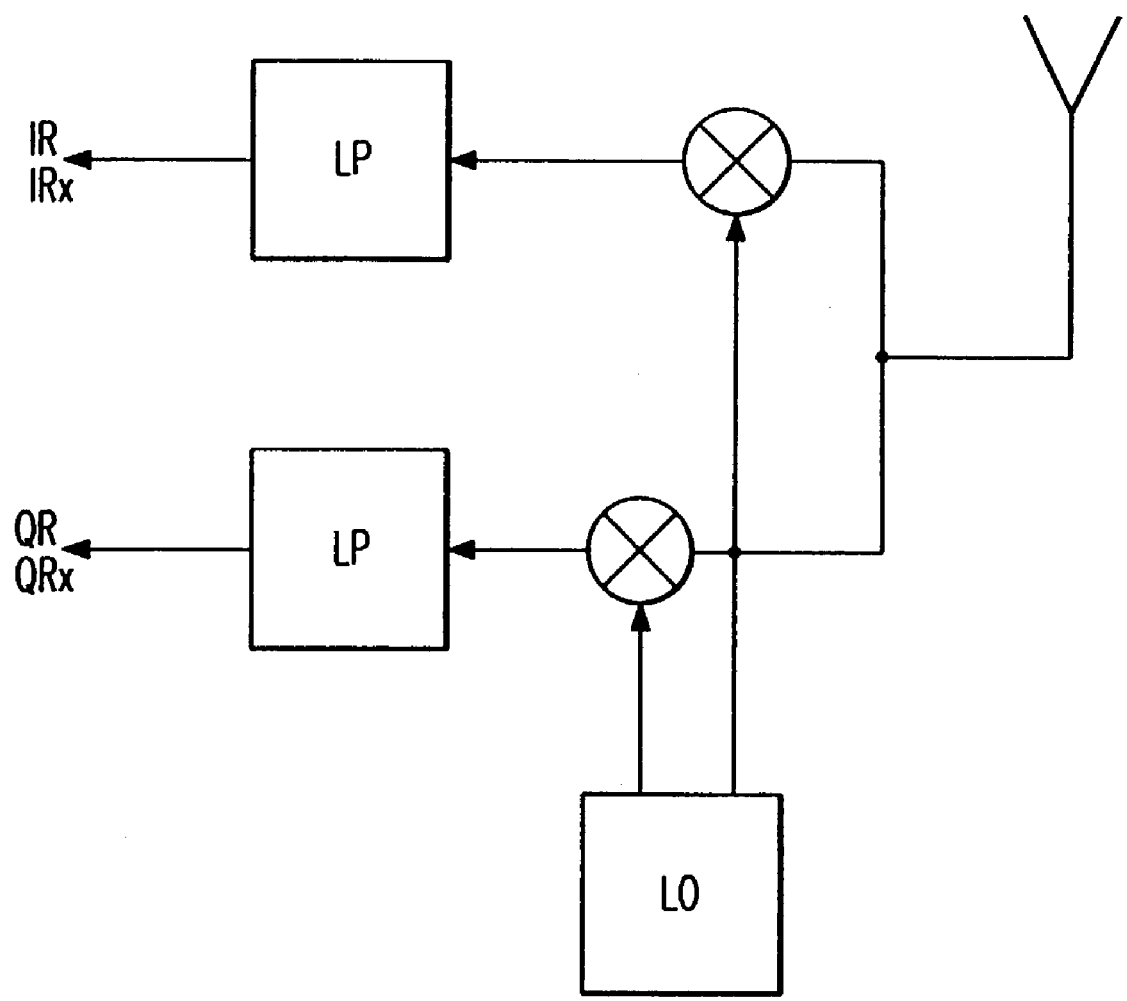
FIG. 1 is a schematic block circuit diagram of the analog part of a receiver unit, supporting a plurality of mobile phone standards, of a mobile station.

Referring now to the figures of the drawing in detail and first, particularly, to FIG. 1 thereof, there is shown the analog part of a receiving unit for a plurality of mobile phone standards. The example relates to a signal processing structure or signal processor which supports the three mobile phone standards GSM, EDGE and TIA/EIA-136 described at the beginning, and at the same time has a single clock frequency generator of the system clock frequency 104 MHz. The mobile phone standards operate here with the following modulation methods, data rates and symbol rates which have already been mentioned at the beginning and are known per se:

| Standard | Modulation | Data rate | Symbol rate |
| --- | --- | --- | --- |
| GSM | GMSK | 270.83 kbit/s | 270.83 kHz |
| EDGE | 3π/8-8-PSK | 812.5 kbit/s | 270.83 kHz |
| TIA/EIA-136 | π/4-DQPSK | 48.6 kbit/s | 24.3 kHz |

After the signal to be evaluated has been received, it is split into the I and Q components by mixing the signal in each of these branches with the frequency of a local oscillator. Each of the components is then fed to a low pass filter (LP). The two low pass filters form the termination of the analog part in the signal processing paths.

Figure 2:
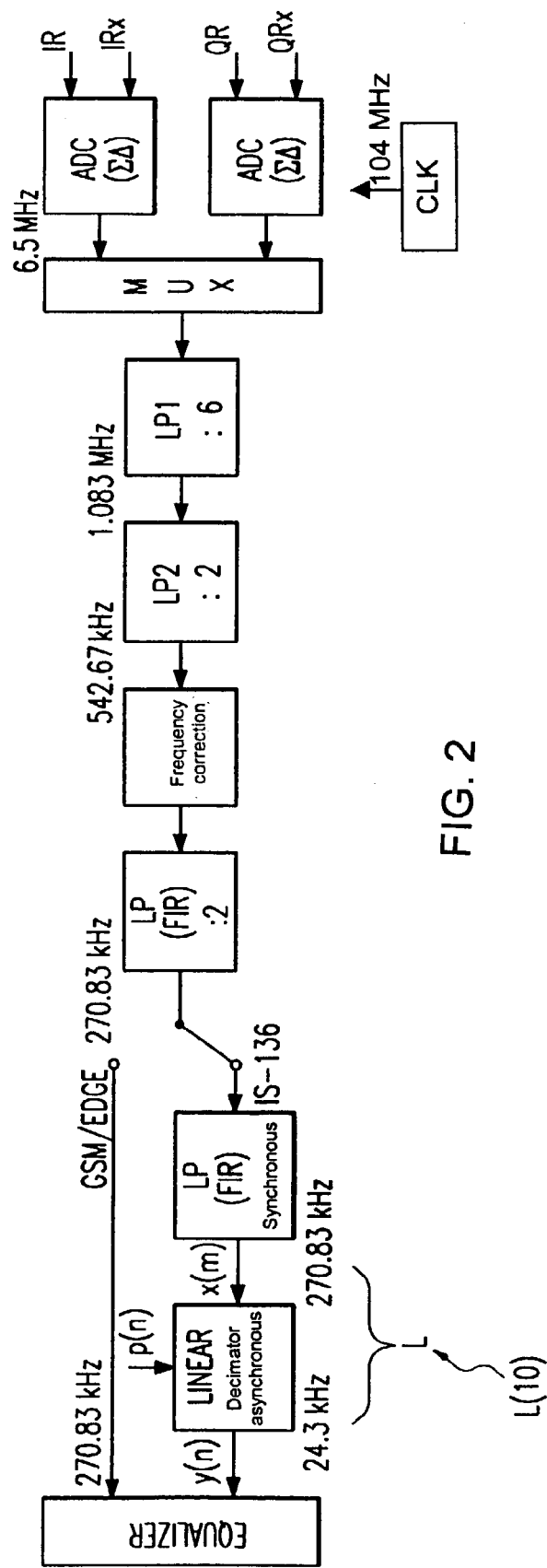
FIG. 2 is a schematic block circuit diagram of the digital part of a reception signal processing structure according to the invention, supporting a plurality of mobile phone standards, of a mobile station.

FIG. 2, which illustrates the digital portion of a signal processor according to the invention, shows the individual functional blocks of a digital part, which are to be operated with the uniform system clock frequency of, for example, 104 MHz. The clock frequency is generated by a clock frequency generator CLK. The A/D converters (ADC), which are illustrated in the right-hand part of the figure, for the I and Q components are operated with a clock which is 16 times slower (i.e., 104: 16=6.5) and which is derived from the system clock. The output signals of the ADCs are then fed to a multiplexer (MUX). The output signal of the multiplexer is then reduced in its sampling frequency firstly by the factor 6 and then by the factor 2, in two LP filters which are connected in series. After subsequent frequency correction, the signal is then reduced further in its sampling frequency by a factor of 2 in an LP/FIR filter.

The signal processing path then branches by means of a switch into a path for the GSM and EDGE standards and a path for the TIA/EIA-136 standard. This is necessary in the present exemplary embodiment as GSM and EDGE signals are based on the same standardized time frame, while IS-136 signals differ from it. Therefore, in the case of IS-136 signals, before the equalizer/decoder (EQUALIZER) decimation takes place which is divided into a synchronous part and an asynchronous part 10. In the case of the IS-136 signal, the filter LP (FIR, synchronous) brings about band limiting in such a way that the separated-off part may comprise merely one linear interpolator (see sections 3.3, 3.4 in "Wenzel"):

$$y(n) = (1-p(n)) \cdot x(m-1) + p(n) \cdot x(m)$$

where p(n) identifies the instantaneous polyphase.

Figure 3:
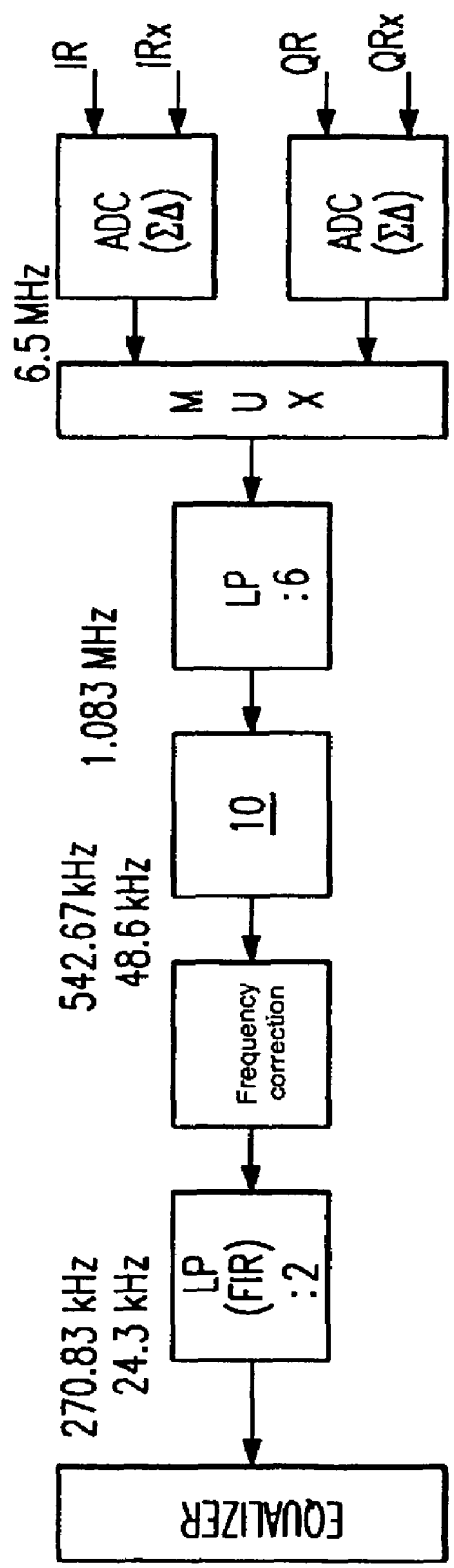
FIG. 3 is a schematic block circuit diagram of the digital part of a reception signal processor according to the invention, supporting a plurality of mobile phone standards, of a mobile station.

FIG. 3 illustrates an inventive digital part of a reception signal processor which supports a plurality of mobile phone standards. In this exemplary embodiment, the "virtual" time frame which is specific to the standard TIA/EIA-136 is specified owing to the symbol rate of 24.3 kHz.

In the circuit according to FIG. 3, in contrast to the digital part in FIG. 2, it is not necessary for the signal processing path to branch. This circuit contains a controllable decimator 10 whose decimation ratio can be set within a relatively wide range. The decimator 10 is arranged downstream of the multiplexer MUX and the first LP filter (division by factor 6) and upstream of the frequency correction circuit in the signal processing path. As a result of the decimator 10, it is not necessary for the signal processing path to branch. Instead, the decimator must be configured in such a way that the decimation ratio can be adapted to the respective reception signal and it must also be possible to control the processing speed of the following blocks correspondingly. The band limitation, which is not the same for all the standards when this structure is present, requires, as decimator 10, an interpolator of a relatively high order, for example third order. Accordingly a decimation factor between 2 and 23 can be set in a variable fashion.

Figure 4:
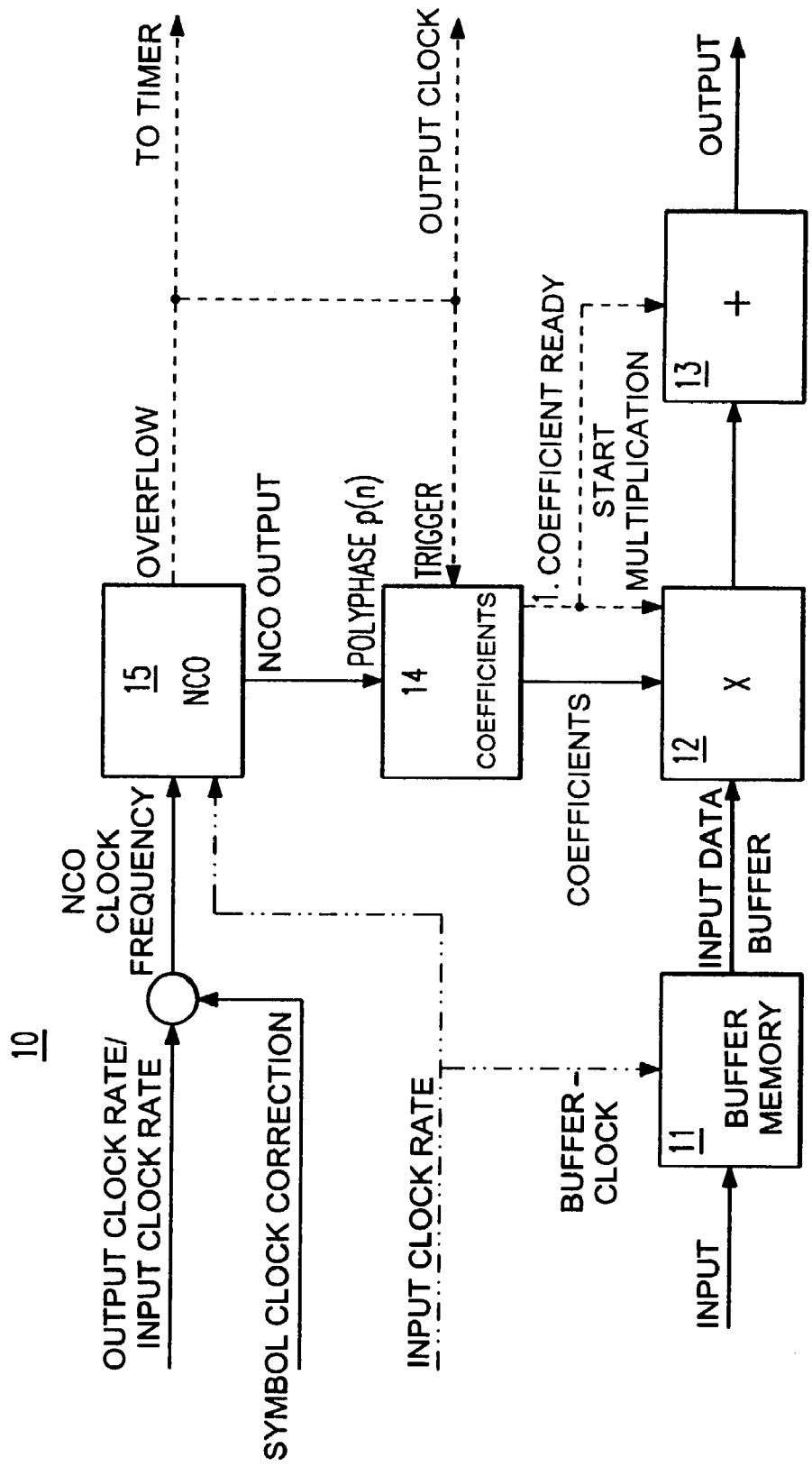
FIG. 4 is a schematic block circuit diagram of an asynchronous decimator.

A basic block circuit diagram of an asynchronous decimator 10 is illustrated in FIG. 4. It contains a data buffer 11, a multiplier 12, an adder unit 13, a coefficient memory 14 and an NCO or a phase accumulator 15 which controls the selection of the coefficient by means of a predefinable control variable.

We claim:

1. A signal processor for digitally evaluating mobile communications reception signals compatible with a plurality of different mobile phone standards, comprising:
    a single clock frequency generator for processing the reception signals of various mobile phone standards; and
    at least one controllable decimator for transposing the reception signals sampled in a uniform time frame into standard-specific time frames;
    said decimator having a phase accumulator, a coefficient memory, a buffer memory, a multiplier, and an adder unit;
    said coefficient memory having an input, said multiplier having a first input, a second input, and an output;
    said phase accumulator having an output connected to said input of said coefficient memory, and said phase accumulator controlling a selection of coefficients with a predefinable control variable;
    said buffer memory having an input receiving input data and an output connected to said first input of said multiplier, said coefficient memory having an output connected to said second input of said multiplier, and said adder unit having an input connected to said output of said multiplier and said adder unit adding terms and outputting an addition result.

2. The signal processor according to claim 1, which further comprises a uniform interface for transferring the reception signals to a variety of assemblies for transposition of a carrier-frequency signal into a low pass position.

3. The signal processor according to claim 2, wherein said interface contains two analog or digital signals formed of a normal component and a quadrative component or amplitude component and phase component.

4. The signal processor according to claim 1, wherein said clock frequency generator and said controllable decimator are commonly integrated on a common chip.

5. The signal processor according to claim 1, wherein said clock frequency generator, said phase accumulator, said coefficient memory, said buffer memory, said multiplier, and said adder unit are commonly integrated on a common chip.

6. A method for digitally evaluating mobile communications reception signals that are compatible with a plurality of different mobile phone standards, which comprises the following method steps: generating a standard-independent clock frequency for signal processing the reception signals;
transposing the reception signals sampled in a uniform time frame into standard-specific time frames with at least one controllable decimator;
providing a decimator with a coefficient memory, a buffer memory, a multiplier, and an adder unit, and controlling the decimator with a phase accumulator, wherein an output of the phase accumulator is connected to an input of the coefficient memory, and controlling a selection of coefficients with the phase accumulator by way of a predefinable control variable;
feeding input data to the buffer memory, outputting from the buffer memory to a first input of the multiplier, outputting from the coefficient memory to a second input of the multiplier, outputting from the multiplier to an input of the adder unit, and adding terms in the adder unit and outputting a result to an output.

7. The method according to claim 6, which further comprises transferring the reception signals via a uniform interface to assemblies for transposing the carrier-frequency signal into the low pass position.

8. The method according to claim 6, which comprises processing signals of the mobile phone standards selected from the group consisting of OSM, EDGE, TIA/EIA-136, mixed forms and partial combinations thereof.

9. The method according to claim 6, which comprises jointly employing circuit components in different signal processing paths for a plurality of mobile phone standards.

10. The method according to claim 6, which comprises jointly employing circuit components for channel selection, frequency conversion, sampling rate conversion, A/D conversion, noise shaping, and phase and frequency correction in different signal processing paths for a plurality of mobile phone standards.

* * * * *